United States Patent [19]

Enderle

[11] Patent Number: 4,480,054

[45] Date of Patent: Oct. 30, 1984

[54] FOAMABLE POLYMER BLEND COMPOSITIONS

[75] Inventor: Susan J. Enderle, Wilmington, Del.

[73] Assignee: E. I Du Pont de Nemours and Company, Wilmington, Del.

[21] Appl. No.: 573,025

[22] Filed: Jan. 23, 1984

Related U.S. Application Data

[63] Continuation-in-part of Ser. No. 514,228, Jul. 15, 1983.

[51] Int. Cl.³ .................................................. C08J 9/10
[52] U.S. Cl. ..................................... 521/84.1; 521/89; 521/92; 521/93; 521/94; 521/95; 521/96; 521/137; 521/140; 521/189; 521/909; 525/127; 525/189; 525/190
[58] Field of Search ....................... 525/127, 189, 190; 521/84, 137, 140, 92, 93, 94, 95, 96

[56] References Cited

U.S. PATENT DOCUMENTS

| | | | |
|---|---|---|---|
| 3,608,006 | 9/1971 | Hosoda et al. | 264/47 |
| 3,755,208 | 8/1973 | Ehrenfreund | 260/2.5 |
| 4,171,411 | 10/1979 | Ehrenfreund | 521/98 |
| 4,247,498 | 1/1981 | Castro | 264/41 |
| 4,251,584 | 2/1981 | Von Engelen et al. | 428/159 |
| 4,370,423 | 1/1983 | Rys-Sikora | 521/189 |
| 4,391,922 | 7/1983 | Harrell | 521/189 |
| 4,391,923 | 7/1983 | Rys-Sikora | 521/189 |

*Primary Examiner*—Morton Foelak
*Attorney, Agent, or Firm*—P. R. Steyermark

[57] ABSTRACT

Compatible blends of an ethylene/methacrylic or ethylene/acrylic acid dipolymer or a terpolymer with n-butyl or isobutyl acrylate with an ethylene/X/Y terpolymer, where X is vinyl acetate or an alkyl acrylate and Y is CO or $SO_2$, with an elastomer, a blowing agent, and a curing agent can be readily formed into stiff foamed articles having very good physical properties, especially split tear and tensile strength. The foamed articles are useful, among others, in such applications as footwear, insulation, shock absorbance, floatation devices, seals and, gaskets.

18 Claims, No Drawings

FOAMABLE POLYMER BLEND COMPOSITIONS

CROSS-REFERENCE TO RELATED APPLICATION

This is a continuation-in-part of my application Ser. No. 514,228 filed July 15, 1983.

BACKGROUND OF THE INVENTION

This invention relates to compatible foamable polymer blend compositions which can be formed into closed-cell foamed articles combining low density with excellent physical properties, especially stiffness, split tear, and tensile strengths.

Polymer foams find numerous uses in many types of industrial articles and consumer goods. Foams can be either elastomeric or rigid, open-cell or closed-cell, high density or low density. For certain applications such as, for example, the midsole in footwear, a readily formable, for example, by compression molding, high quality, low density foam would be very desirable; yet, a completely satisfactory material for that purpose has not yet been discovered. By "low density" is meant a density of at most about 0.15 g/cm$^3$.

There exist commercial foamable compositions based on ethylene/vinyl acetate copolymers. Such compositions usually contain blends of ethylene/vinyl acetate copolymers with other polymers, especially with elastomers or with polyethylene, but they tend to give foams having unsatisfactory physical properties unless the foam density is at least about 0.18 g/cm$^3$. Sometimes those prior art compositions also contain a small amount of an ionomer, such as a partially or completely neutralized copolymer of ethylene with an unsaturated carboxylic acid, which acts more or less as a compatibilizer. Although an increased proportion of ionomer would improve the foam properties, compression-molded foams of this type would be difficult to make because ionomers tend to stick to compression-molding equipment; further, ionomer foams tend to be very stiff, so that foams made from such blends would be expected to be unsatisfactory for some uses.

SUMMARY OF THE INVENTION

According to the present invention, there is provided a compatible, foamable, readily formable, curable polymer blend consisting essentially of the following components present in the approximate stated amounts (in parts by weight):

(1) 50-100 parts of a dipolymer E/A or terpolymer E/A/B, wherein E is ethylene; A is acrylic or methacrylic acid; and B is n-butyl or isobutyl acrylate; the weight proportion of monomer A in both the dipolymer and the terpolymer being about 2-20%, and the weight proportion of monomer B in the terpolymer being at most about 23%; the carboxylic acid groups in either type of polymer being either unneutralized or neutralized to an extent of at most about 71% with metal ions having a valency of from 1 to 3;

(2) 2-40 parts of a terpolymer E/X/Y, where E is ethylene; X is vinyl acetate or a C$_1$-C$_8$ alkyl acrylate; and Y is CO or SO$_2$; the weight proportions of X and Y being as follows:
Y about 1-15%;
X, when it is vinyl acetate, about 15-30%, and when it is an alkyl acrylate, about 10-55%;

(3) 2-40 parts of an elastomer,
(4) 1-10 parts of a blowing agent;
(5) 0-10 parts of an activator for the blowing agent;
(6) 0.5-10 parts of a curing agent for the E/X/Y terpolymer selected from peroxides, sulfur and sulfur-releasing agents, and diamines and their precursors;
(7) 0-15 parts of a processing aid; and
(8) 0-100 parts of a filler.

There also are provided cured foamed articles made from the above foamed compositions.

DETAILED DESCRIPTION OF THE INVENTION

Both E/A dipolymers and E/A/B terpolymers are well known and commercially available; some, for example, from E. I. du Pont de Nemours and Company and ethylene/acrylic acid copolymer from Dow Chemical Co. Neutralized di- and terpolymers also are available, i.a., from E. I. du Pont de Nemours and Company. The preferred amount of acrylic or methacrylic acid in a dipolymer or terpolymer is 8-15 weight percent. The preferred amount of a polymer of this group is about 75-90 parts. When the carboxylic acid groups are neutralized, the neutralizing metal ions are preferably sodium, zinc, magnesium, or aluminum, but may also be other metals from the first three groups of the Periodic Chart of the Elements.

Certain E/X/Y terpolymers are commercially available, while others can be made according to known processes. For example, E/VA/CO terpolymers, when VA is vinyl acetate, are available under the name Elvaloy ® from E. I. du Pont de Nemours and Company. The carbon monoxide content in those terpolymers in which X is vinyl acetate should preferably be no higher than about 7% by weight; otherwise, polymer compatibility may be adversely affected. Terpolymers in which Y is SO$_2$ are described in U.S. Pat. No. 3,684,778 to Hammer, and terpolymers in which X is an alkyl acrylate are described in U.S. Pat. No. 2,495,286 to Brubaker. The preferred terpolymer in which X is an alkyl acrylate is an ethylene/n-butyl acrylate/CO terpolymer, which can be made according to the general method taught by Brubaker. The weight proportion of n-butyl acrylate in the terpolymer is about 15-35%. Other typical alkyl acrylates and their weight proportions in the terpolymer include the following: methyl acrylate (15-55%), ethyl acrylate (15-40%), and t-butyl acrylate (10-25%). The preferred amount of E/X/Y terpolymer in the composition is 10-30 parts. Other alkyl acrylates include, among others, propyl, isopropyl, pentyl, hexyl, heptyl, octyl, and isooctyl acrylates.

Any elastomer which can be blended with the E/A copolymer of E/A/B terpolymer and with the E/X/Y terpolymer can be used in the compositions of this invention, for example, natural rubber, polyurethane, polyisoprene, EPDM rubber (ethylene/propylene/diene terpolymer or tetrapolymer), chloroprene polymer, SBR (styrene-butadiene rubber), nitrile rubber, chlorosulfonated polyethylene, and chlorinated polyethylene. The first three above-named elastomers are preferred. The preferred amount of elastomer in the compositions of this invention is 10-30 parts. Suitable elastomers must have sufficiently low softening points to permit good blending at the operating temperature.

The polymer blends of this invention are compatible in the broad sense of forming uniform, although not necessarily single-phase, mixtures having useful physical properties. Compatibility is evidenced, for example, by ease of banding on a roll mill and by absence of gross irregularities or discontinuities in molded or extruded articles. In general, films of compatible blends may range from transparent to hazy to opaque but retain strength properties no lower than the lowest properties of any component. Incompatible blends tend to form nonuniform films that are typically brittle and low in tear strength.

Any suitable blowing agent can be used, for example, azodicarbonamide, a hydrazide, or a fluorocarbon or chlorofluorocarbon.

Various activators for blowing agents are known and can be used, if desired. Typical such additives are zinc oxide and zinc stearate. At least about 0.5 part of an activator per 100 parts of polymer blend is recommended. Blowing agents such as, for example, fluorocarbons and chlorofluorocarbons do not require activators.

Suitable terpolymer curing agents include, for example, dicumyl peroxide;
1,1-bis(t-butylperoxy)diisopropylbenzene;
1,1-bis(t-butylperoxy)-3,3,5-trimethylcyclohexane;
2,5-dimethyl-2,5-di(t-butylperoxy)hexane; sulfur and sulfur-releasing agents such as, for example, thiuram polysulfides and sodium polysulfides; and diamines and their precursors such as, for example, ethylenediamine, p-phenylenediamine,
4,4'-methylenedianiline,
4,4'-methylenebis-2-chloroaniline,
hexamethylenediamine carbamate and methylenedianiline complexes with LiCl or NaCl.

Generally speaking sulfur cure recipes and conditions would be the same as those employed for vulcanization of rubber. A vulcanization accelerator such as, for example, a thiazole, guanidine, thiuram, or dithiocarbamate should be added to increase the cure rate. Sulfur cure of E/VA/CO terpolymers is described in U.S. Pat. No. 4,172,939 to Hoh, which is incorporated herein by reference. Crosslinking with diamines and diamine precursors is catalyzed by acids such as, for example, p-toluenesulfonic, chloroacetic, phosphorous, and organophosphonic acids. An effective amount of diamine or diamine precursor is about 0.1–2 moles per kilogram of E/X/Y terpolymer.

Processing aids may be added to help blending of the components to a uniform mixture and to improve handling in molding equipment. Processing oils, well known in the rubber industry, low molecular weight polyethylene, and various waxes, stearic acid, and other known additives are useful for this purpose.

Fillers such as, for example, silica, clay, talc, calcium carbonate, carbon black, etc., which reduce the cost of the finished article while at the same time improving the strength of the cured product, pigments, vulcanization accelerators, antioxidants, and stabilizers may be added to the compositions as required.

Blending of these ingredients can be carried out in any commercial mixing equipment such as, for example, extruders, rubber mills, Banbury mixers, internal mixers, and continuous mixers. Blending must be done below the lowest decomposition temperature of the thermally unstable components, such as peroxides and other free radical generators, blowing agents, diamine precursors, and sulfur-releasing agents. Normally, blending will be carried out below about 140° C. It can be done in one step, with all the components added at the same time, or in two steps, preliminary mixing being done, for example, in a Banbury mixer at a given temperature, and further blending being accomplished on a rubber mill either at the same or at a different temperature.

The blend is then placed in a hot compression mold maintained at a sufficient pressure to contain the product in the mold, for example, at 270 MPa or more. Decomposition of the blowing agent occurs at an elevated temperature; for example, uncatalyzed azodicarbonamide decomposes at about 200°–215° C., but in the presence of an activator such as zinc oxide it decomposes at 130°–155° C.

The vulcanizing agent also decomposes and/or reacts at this elevated temperature to cure the E/X/Y terpolymer. Frequently, the elastomer present in the mixture also is cured with this curing agent. Thus, natural rubber, chloroprene polymers, polyisoprene, and EPDM rubbers all are cured by sulfur and sulfur precursors. All elastomers also are cured to some extent with free-radical generators, such as peroxides and azo compounds.

Heating in the mold is continued for a sufficient time to produce a uniformly cured product having satisfactory properties. It is usually sufficient to maintain a temperature of about 165° C. for about 8–13 minutes. Actual foaming occurs after release of pressure, especially when the article is removed from the mold. Since foaming results in expansion of the article, the finished product is larger than the mold cavity in which it was formed. The density of the foamed product should preferably be less than 0.10 g/cm$^3$.

The foamed articles made, for example, by extrusion, injection-molding, or compression-molding of the foamable blends of the present invention are useful in such diversified fields as insulation, shock absorbance, flotation devices, seals and gaskets, and footwear.

This invention is now illustrated by the following examples of certain representative embodiments thereof, where all parts, proportions, and percentages are by weight unless otherwise indicated. All data not originally obtained in SI units have been converted to SI units. The experimental details and results are given in the Tables, following the description of the examples.

EXAMPLE 1

(PREFERRED EMBODIMENT)

Compounding

A 1100 cm$^3$ stainless steel Banbury mixer was allowed to heat up to 138° C., with chill water flow to the rotors. Pale crepe (natural rubber) was added to the mixer and allowed to flex for 1–2 minutes. An ethylene/methacrylic acid/isobutyl acrylate 80:10:10 terpolymer neutralized with sodium ions to the extent of 36% and having a melt index of 1 (E/MAA/i-BuA ionomer) was then added to the mixer; and after it had softened and blended with the rubber, an E/VA/CO 71:26:3 terpolymer having a melt index of 20 (E/VA/CO A) was mixed into the compound. Stearic acid then was added and finally, in three portions, fine particle amorphous silicon dioxide. Zinc oxide, which is the blowing agent activator, can be added either to the Banbury mixer or, in the next stage, to the roll mill.

The compound was milled on a chrome-plated roll mill at 82° C. After the compound banded on the mill, magnesium oxide was added. This was followed by α,α'-bis(t-butyl peroxy)diisopropylbenzene curing agent, Vul Cup ®40KE (Hercules Corp.) and azodicarbonamide blowing agent, Kempore ®200 (Olin Corp.). Total mill time was 15-30 minutes.

Foam Preparation

One hundred grams (100 g) of the milled compound was compression-molded in a 7.5 cm×7.5 cm×1.25 cm press having polished steel platens which were sprayed with a release agent. The press was steam heated to 177° C. and was maintained at a pressure of 276 MPa.

EXAMPLES 2 AND 3

In Example 2 the level of E/VA/CO A terpolymer was increased, while in Example 3 the terpolymer was completely eliminated. The product of Example 2 had good physical properties, while the product of Example 3 was difficult to process, stuck to the mold, and had poor physical properties. Because of smaller chase depth, the product of Example 3 may have been overcured to some extent.

EXAMPLE 4

This is a comparative example which illustrates the preparation of the best foam based on prior art ingredients, namely, the E/MAA/i-BuA ionomer, an ethylene/vinyl acetate dipolymer, and an elastomer. Low molecular weight polyethylene, AC 617A wax (Allied), was added as a processing aid because otherwise the compound would tend to stick to the mold. The cure time was significantly higher and, considering the 50% higher density of this foam, its physical properties were much poorer than in Examples 1 and 2.

EXAMPLES 5 AND 6

These also are comparative examples, where, the effect of the E/MAA/i-BuA A ionomer is compared with that of an ethylene/methacrylic acid copolymer in formulations containing an ethylene/vinyl acetate dipolymer instead of an E/X/Y terpolymer. In Example 5 the ionomer was used, while in Example 6 a copolymer of 85% of ethylene and 15% of methacrylic acid, having a melt index of 25 was used. In both cases the foamed products had much poorer properties than did the products of Examples 1 and 2. In these examples the chase size was the same as in Example 3.

EXAMPLE 6

In this comparative example, an E/VA/CO 66:24:10 terpolymer (E/VA/CO B) was used. Because of its high CO content, the terpolymer was not compatible with the other components, as was shown by the excessively high roll mill temperature (149° C.) required for mixing the ingredients. Blowing occurred on the roll mill; the foam was non-uniform; and reliable physical data could not be obtained.

TABLE 1

| Ingredients (parts) | Examples | | | | | |
|---|---|---|---|---|---|---|
| | 1 | 2 | 3 | 4 | 5 | 6 |
| E/MAA/i-BuA ionomer | 85 | 80 | 100 | 80 | | 80 |
| E/MAA copolymer | | | | | 80 | |
| E/VA copolymer | | | | 20 | 20 | |
| E/VA/CO terpolymer A | 15 | 20 | | | | |
| E/VA/CO terpolymer B | | | | | | 20 |
| Crepe Rubber | 15 | 15 | 6.5 | 15 | 5 | 15 |
| Polyurethane | | | | | | |
| Silicon dioxide | 15 | 15 | 20 | 20 | 8 | 15 |
| Zinc Oxide | 6 | 6 | 6 | 6 | 6 | 6 |
| Stearic Acid | 4 | 4 | 4 | 4 | 4 | 4 |
| Low M.W. polyethylene | | | | 5 | 5 | 10 |
| Blowing agent | 9.8 | 9.8 | 5.4 | 9.6 | 8.9 | 8.8 |
| Peroxide curing agent | 2.8 | 2.8 | 1.7 | 2.7 | 2.7 | 2.7 |
| Magnesium Oxide | 1.4 | 1.4 | 1.7 | 1.2 | 1.4 | 1.4 |
| Cure Conditions | | | | | | |
| Time (min.) | 8.5 | 10 | 10 | 13 | 10 | |
| Temperature (°C.) | 177 | 171 | 171 | 171 | 171 | |
| Chase Size (cm) | 7.5 × 7.5 × 1.25 | 7.5 × 7.5 × 1.25 | 7.5× 7.5 × 0.623 | 7.5 × 7.5 × 1.25 | 7.5 × 7.5 × 0.623 | |
| Sample Size (g) | 100 | 100 | 50 | 100 | 50 | |
| Physical Properties | | | | | | |
| Density (gm/cc) (ASTM D792) | 0.05 | 0.06 | 0.07 | 0.09 | 0.09 | |
| Hardness-Shore A (ASTM D2240) | 29 | 26 | 24.5 | 37 | 38 | |
| Tensile Strength, MPa (ASTM D412) | 1.20 | 0.97 | 0.62 | 1.16 | 1.40 | |
| Elongation (%) (ASTM D412) | 157.1 | 158.7 | 80.5 | 126.1 | 132.5 | |
| Split Tear Kg/m (ASTM D3474) | 294.7 | 198.2 | 67.9 | 142.9 | 87.5 | |

The compositions of the following Examples 7 and 8 have been processed differently from those of Examples 1 through 6. The results show that within a broad range of conditions the E/VA/CO blends have superior properties to equivalent E/VA blends.

EXAMPLE 7

Compounding

A 1100 cm³ stainless steel Banbury mixer was started with no chill water flow to the rotors. During the entire mixing cycle, the temperature increased to 200° C. Pale crepe (natural rubber) was added to the mixer and allowed to flex for 1-2 minutes. An ethylene/methacrylic acid/isobutyl acrylate ionomer identical with that of Example 1 was then added to the mixer; and after it had softened and blended with the rubber, E/VA/CO A terpolymer was mixed into the compound. Stearic acid then was added, then titanium dioxide, and finally, in two portions, fine particle amorphous silicon dioxide. Part of the zinc oxide was then added to the Banbury (adding too much zinc oxide to the 200° C. Banbury can cause excessively high viscosity). Total Banbury time was approximately 8 minutes.

The compound was milled on a chrome-plated roll mill at 65° C. After the compound banded on the mill, the remaining zinc oxide was added. This was followed by the same curing agent and blowing agent as in Example 1 and magnesium oxide. Total mill time was 15–30 minutes.

Foam Preparation

Four hundred grams (400 g) of the milled compound was compression-molded in a 15 cm×15 cm×1.25 cm press having polished steel platens which were sprayed with a release agent. The press was steam heated to 167° C. and was maintained at a pressure of 276 MPa.

EXAMPLE 8

This is a comparative example, which used the processing technique of Example 7 for the preparation of a foam based on prior art ingredients, namely, the E/MAA/i-BuA ionomer, an ethylene/vinyl acetate dipolymer, and an elastomer. The E/VA dipolymer (E/VA No. 2) had a melt index of 60 and contained 26% of vinyl acetate. The cure time was longer than that in Example 7, and the physical properties of the product were poorer.

TABLE 2

| Ingredients (parts) | Examples | |
|---|---|---|
| | 7 | 8 |
| E/MAA/i-BuA ionomer | 85 | 85 |
| E/VA/CO terpolymer A | 15 | — |
| Crepe Rubber | 15 | 15 |
| Silicone Dioxide | 15 | 15 |
| Zinc Oxide | 6.1 | 6.1 |
| Stearic Acid | 4 | 4 |
| Blowing Agent | 7.5 | 7.5 |
| Peroxide curing agent | 2.4 | 2.4 |
| Magnesium Oxide | 1.2 | 1.2 |
| Titanium Dioxide | 2 | 2 |
| E/VA Copolymer No. 2 | | 15 |
| Cure Conditions | | |
| Time (min.) | 9 | 15.5 |
| Temperature (°C.) | 332 | 332 |
| Chase Size (cm) | 15 × 15 × 1.25 | 15 × 15 × 1.25 |
| Sample Size (g) | 400 | 400 |
| Physical Properties | | |
| Density (gm/cc) (ASTM D792) | 0.07 | 0.06 |
| Hardness-Shore A (ASTM D2240) | 38 | 25 |
| Tensile Strength, MPa (ASTM D412) | 1.62 | 1.12 |
| Elongation (%) (ASTM D412) | 165.5 | 78 |
| Split Tear Kg/m (ASTM D3574) | 193.2 | 95.7 |

EXAMPLES 9–12

In the following examples, the compounding technique of Example 7 was used. Foams were made by compression-molding for 10 minutes at 165° C. in a 7.5×7.5×1.25 cm press. In addition to E/MAA/i-BuA ionomer and to E/VA/CO terpolymer A, which were the same as in Examples 1–8, the following polymers were used:

Unneutralized ethylene/n-butyl acrylate/methacrylic acid terpolymer 71:21:8—E/n-BA/MAA, melt index 25;

ethylene/acrylic acid copolymer 91:9 neutralized with sodium ions to an extent of 42%—E/AA, melt index 1; and ethylene/methyl acrylate/carbon monoxide terpolymer 34:55:11—E/MA/CO, melt index 15.

TABLE 3

| Ingredients (parts) | Examples | | | |
|---|---|---|---|---|
| | 9 | 10 | 11 | 12 |
| E/MAA/i-BuA ionomer | 85 | — | — | — |
| E/n-BuA/MAA | — | 85 | — | 85 |
| E/AA | — | — | 85 | — |
| E/VA/CO terpolymer A | — | 15 | 15 | — |
| E/MA/CO | 15 | — | — | 15 |
| Crepe Rubber | 15 | 15 | 15 | 15 |
| Silicon Dioxide | 15 | 15 | 15 | 15 |
| Zinc Oxide | 6 | 6 | 6 | 6 |
| Stearic Acid | 4 | 4 | 4 | 4 |
| Blowing agent | 7 | 7 | 7 | 7 |
| Curing agent | 2 | 2 | 2 | 2 |
| Magnesium Oxide | 1 | 1 | 1 | 1 |
| Titanium Dioxide | 2 | 2 | 2 | 2 |
| Foam Physical Properties | | | | |
| Density (gm/cc) (ASTM D792) | 0.16 | 0.14 | 0.13 | 0.15 |
| Hardness-Shore A (ASTM D2240) | 43 | 27 | 44 | 29 |
| Tensile Strength, (mPa) (ASTM D412) | 2.36 | 1.30 | 1.63 | 1.57 |
| Elongation (%) (ASTM D412) | 147 | 125 | 114 | 264 |
| Split Tear Kg/m (ASTM D3574) | 193 | 127 | 143 | 346 |

I claim:

1. A compatible foamable, readily formable, curable polymer blend consisting essentially of the following components present in the following approximate weight amounts:
   (1) 50–100 parts of a dipolymer E/A or terpolymer E/A/B, wherein E is ethylene; A is acrylic or methacrylic acid; and B is n-butyl or isobutyl acrylate; the weight proportion of monomer A in both the dipolymer and the terpolymer being about 2–20% and the weight proportion of monomer B in the terpolymer being at most about 23%;
   the carboxylic acid groups in either type of polymer being either unneutralized or neutralized to an extent of at most about 71% with metal ions having a valency of from 1 to 3;
   (2) 2–40 parts of a terpolymer E/X/Y, where E is ethylene; X is vinyl acetate or a $C_1$–$C_8$ alkyl acrylate; and Y is CO or $SO_2$; the weight proportions of X and Y being as follows:
   Y about 1–15%;
   X, when it is vinyl acetate, about 15–30%, and when it is an alkyl acrylate, about 10–55%;
   (3) 2–40 parts of an elastomer;
   (4) 1–10 parts of a blowing agent;
   (5) 0–10 parts of an activator for the blowing agent;
   (6) 0.5–10 parts of a curing agent for the E/X/Y terpolymer selected from peroxides, sulfur and sulfur-releasing agents, and diamines and their precursors;
   (7) 0–15 parts of a processing aid; and
   (8) 0–100 parts of a filler.

2. A blend of claim 1 wherein monomer A is methacrylic acid, and the weight proportion of methacrylic acid in the dipolymer or terpolymer (1) is 8–15%.

3. A blend of claim 2 wherein the neutralizing metal ions are selected from the group consisting of sodium, zinc, magnesium, and aluminum.

4. A blend of claim 1 wherein monomer B is n-butyl acrylate.

5. A blend of claim 1 wherein monomer B is isobutyl acrylate.

6. A blend of claim 1 wherein the amount of dipolymer or terpolymer (1) is 75-90 parts by weight.

7. A blend of claim 1 wherein monomer Y is carbon monoxide.

8. A blend of claim 7 wherein monomer X is vinyl acetate.

9. A blend of claim 8 wherein the amount of carbon monoxide in the terpolymer is at most about 7% by weight.

10. A blend of claim 7 wherein monomer X is an alkyl acrylate.

11. A blend of claim 10 wherein the alkyl acrylate is n-butyl acrylate, which is present in the terpolymer in an amount of about 15-35% by weight.

12. A blend of claim 1 which contains fillers.

13. A blend of claim 1 which contains processing aids.

14. A blend of claim 1 which contains a blowing agent activator in an amount of at least 0.5 part per 100 parts by weight of polymer blend.

15. A blend of claim 14 wherein the activator is zinc oxide or zinc stearate.

16. A blend of claim 1 wherein the elastomer is selected from the group consisting of natural rubber, polyisoprene, and polyurethanes.

17. A blend of claim 1 wherein the blowing agent is azodicarbonamide.

18. A blend of claim 1 wherein the curing agent is a peroxide.

* * * * *